US009468853B2

(12) United States Patent
Liendo et al.

(10) Patent No.: US 9,468,853 B2
(45) Date of Patent: Oct. 18, 2016

(54) SYSTEMS AND METHODS FOR EXECUTABLE FILE IDENTITY CAPTURE DURING INDIRECT APPLICATION LAUNCH

(71) Applicants: Carlos Liendo, Fort Lauderdale, FL (US); Danae Sierra, Miami, FL (US); Amaury Brito Alvarez, Miami, FL (US); Alexander Galiano, Miami Beach, FL (US)

(72) Inventors: Carlos Liendo, Fort Lauderdale, FL (US); Danae Sierra, Miami, FL (US); Amaury Brito Alvarez, Miami, FL (US); Alexander Galiano, Miami Beach, FL (US)

(73) Assignee: Dell Products LP, Round Rock, TX (US)

(*) Notice: Subject to any disclaimer, the term of this patent is extended or adjusted under 35 U.S.C. 154(b) by 121 days.

(21) Appl. No.: 14/182,647

(22) Filed: Feb. 18, 2014

(65) Prior Publication Data
US 2015/0196844 A1    Jul. 16, 2015

Related U.S. Application Data

(60) Provisional application No. 61/927,939, filed on Jan. 15, 2014.

(51) Int. Cl.
*A63F 13/77*    (2014.01)
*A63F 13/48*    (2014.01)
*A63F 13/79*    (2014.01)

(52) U.S. Cl.
CPC .............. *A63F 13/77* (2014.09); *A63F 13/48* (2014.09); *A63F 13/79* (2014.09); *A63F 2300/209* (2013.01)

(58) Field of Classification Search
USPC ......................................... 463/40, 42, 43, 20
See application file for complete search history.

(56) References Cited

U.S. PATENT DOCUMENTS

| | | | |
|---|---|---|---|
| 2008/0167133 A1* | 7/2008 | White | H04N 5/76 463/43 |
| 2009/0054117 A1* | 2/2009 | Beser | A63F 13/12 463/1 |
| 2013/0067126 A1 | 3/2013 | Casparian et al. | |

OTHER PUBLICATIONS

Alienware X51 R2 Review, Compact Gaming System, Hardware Information, Nov. 30, 2013, 4 pgs.
What is AlienAdrenaline?, Article ID 543175, May 3, 2012, 3 pgs.

* cited by examiner

*Primary Examiner* — Paul A D'Agostino
*Assistant Examiner* — Brandon Gray
(74) *Attorney, Agent, or Firm* — Egan, Peterman, Enders & Huston LLP (57) ABSTRACT

Systems and methods are disclosed herein for locally capturing the identity of the actual executable file required to set system configuration upon indirect launching of a computer game or other type of indirectly-launched file. Such a captured identity of an executable file may be added to a locally and dynamically created and updated local white list which then may be used to determine when to set the desired game mode configuration upon indirect launching of a game so that the desired game mode configuration may remain active for as long as the game is open and running, or for as long as the game is in-focus within an active window.

18 Claims, 5 Drawing Sheets

SYSTEMS AND METHODS FOR EXECUTABLE FILE IDENTITY CAPTURE DURING INDIRECT APPLICATION LAUNCH

This application claims the benefit of U.S. Provisional Patent Application Ser. No. 61/927,939, filed on Jan. 15, 2014 and entitled "Systems And Methods For Executable File Identity Capture During Indirect Application Launch", which is incorporated herein by reference in its entirety for all purposes.

FIELD OF THE INVENTION

This application relates to information handling systems and, more particularly, to indirect launch of applications on information handling systems.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Computer games are examples of applications that are run on information handling systems in conjunction with gaming control centers such as the Alienware Command Center (AWCC) available from Dell Computer of Round Rock, Tex. Such gaming control centers include separate user-accessible applications that are often provided on an information handling system to monitor direct launching of game applications, and to allow a user to associate specific system user-defined system configurations and actions with a particular directly-launched game. Once the user selects a game to create a new game mode, a profile configurator is provided as a software component of a gaming control center that is responsible for saving the game configuration settings and actions that will be associated with the game/application. Examples of specific user-defined system configurations that may be saved and linked to a particular game include specific keyboard and mouse lighting settings, audio output settings, power management settings, performance monitoring recording settings, designated keyboard macros and/or variable pressure key settings and/or macros, etc. Every time a particular game is directly launched by the user, a component in the gaming control center recognizes that the game has been directly-launched and responds by applying the specific user-defined system configurations to the corresponding system components for as long as the game remains active and running. The gaming control center recognizes when the particular directly-launched game is closed and responds by reverting to the default (non-game) system configurations.

Some computer games are required to be launched through existent game platforms such as Steam, Webzen, Desura, Origin, etc. This process is known as indirect launching. When such computer games are downloaded and installed on an information handling system using existent game platforms, the created game shortcuts are linked to a platform portal launcher (usually for user authentication), rather than to the actual game executable. The platform portable launcher is a separate executable file maintained on the information handling system that acts as a "wrapper" for the actual game application. After the authentication is completed in the portal, the actual game will be launched and the portal launcher closes. However, in such situations a component in the gaming control center interprets the closing of the portal launcher to be the closing of the actual game and prematurely reverts the system configuration, defined by the user to be used while the specific game is played.

A "white list" is a file that is pre-installed and/or downloaded across a network to an information handling system from a remote server in conjunction with the use of existent game platforms and game applications. Such a white list contains a predefined list of game executable file names that is maintained and updated remotely by the software vendor as new games or game revisions/versions become available, and must be downloaded from the vendor. The purpose of such a white list is to correctly associate a game executable file to the desired configuration. Such a conventional white list must be updated from a remote server periodically as new games, game versions, and new names of game executable files are released in order to keep the white list up to date. A conventional white list is used by a system to determine whether or not a game mode configuration should be enabled given the desired game.

SUMMARY OF THE INVENTION

Systems and methods are disclosed herein for locally capturing the identity (e.g., name of the game and/or the game executable full filename) of the actual executable file required to set system configuration upon indirect launching of a computer game or other type of indirectly-launched file. In one embodiment, such a captured identity of an executable file may be added to a locally and dynamically created and updated local white list which then may be used to determine when to set the desired game mode configuration (e.g., particular system environmental configuration defined by the user for a given game) upon indirect launching of a game so that the desired game mode configuration may remain active for as long as the game is open and running, and may be used to determine when to restore the previous system configuration only upon closing of the actual game, i.e., rather than upon closing of an indirect launcher such as portal launcher. The disclosed systems and methods may advantageously be used to maintain game specific user configurations the entire time that an indirectly-launched game or other application is active, or for as long as the game is in-focus within an active window, thus enhancing user satisfaction.

In one embodiment, a dynamic white list may be advantageously created and updated in a local manner on the information handling system, without requiring remote white list updates, e.g., from a remote server. In such an embodiment, the locally-created white list may be created and updated dynamically on the information handling system, keeping up with the game release market while at the same time eliminating the need to have a pre-installed white list or to download an updated white list to the information handling system from across a network. Moreover, using the disclosed systems and methods enables new games or game executable files with new names to be immediately added to the white list as they are launched by a user, thus allowing the user the ability to immediately configure a new game mode without requiring the wait for a remote download of an updated white list when it becomes available. This is in contrast to conventional downloaded white lists that will always lag behind new game releases which means a user will not be able to effectively associate specific system settings and actions when creating a new game mode using the new title until a new updated conventional white list is available for download.

In one exemplary embodiment, the disclosed systems and methods may be implemented by an information handling system using an application mode engine (e.g., such as game mode engine) of an application control center (e.g., such as a gaming control center) that is configured to listen for entry of a specific user keystroke sequence or other specific user entry information to trigger the capture of the file name of the game executable file. In this embodiment, the specific keystroke combination may be pressed by a user at any time while the user is playing a given game application (or another type of indirectly-launched application is active) to trigger the game mode engine to capture the name of the executable file, which may then be registered or otherwise stored for future monitoring. Thereafter, the game mode engine may utilize the captured executable file to determine when to activate a particular game mode configuration and when to restore the default system configuration based on detection of when the actual game or other indirectly-launched application is launched or closed, respectively. Thus, in one embodiment the status of a portal launcher for a given game may be effectively bypassed (or ignored) for purposes of determining when to activate a particular game mode configuration and when to restore the system back to its default system configuration.

In one respect, disclosed herein is an information handling system, including: persistent storage; and at least one processing device coupled to persistent storage. The processing device may be configured to: indirectly launch and run the at least one given executable file, capture file identity information for the given executable file while it is launched and running, and save the captured file identity information of the given indirectly launched file to a dynamic list of file identity information stored on the persistent storage.

In another respect, disclosed herein is a method of managing file identity information for an information handling system. The method may include using at least one processing device to: indirectly launch and run at least one given executable file; capture file identity information for the given executable file while it is launched and running; and save the captured file identity information of the given indirectly launched file to a dynamic list of file identity information stored on the persistent storage.

DESCRIPTION OF ILLUSTRATIVE EMBODIMENTS

Figure 1:
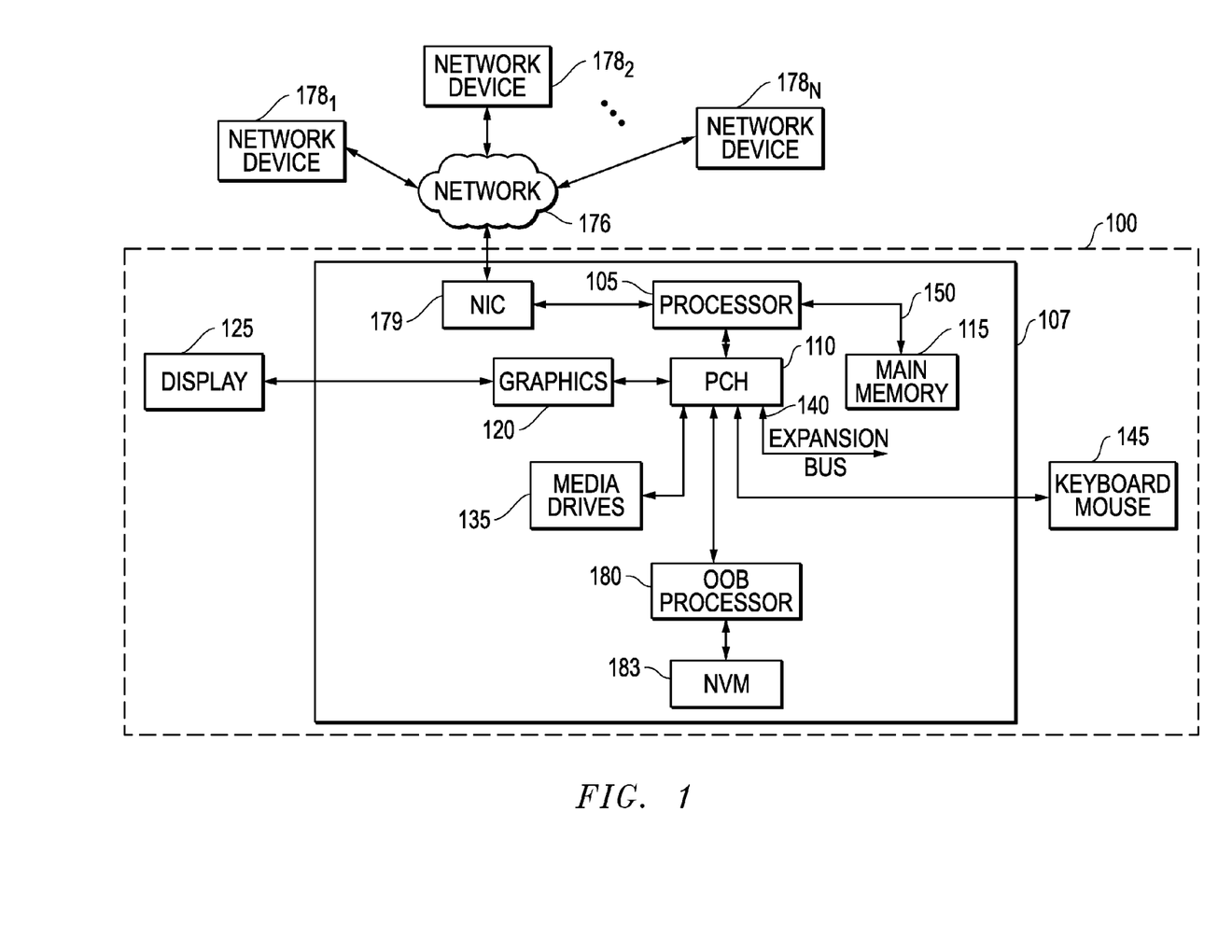
FIG. 1 illustrates a block diagram of an information handling system according to one exemplary embodiment of the disclosed systems and methods.

FIG. 1 is a block diagram of an information handling system 100 as it may be configured according to one exemplary embodiment of the disclosed systems and methods. Information handling system 100 may be, for example, a desktop computer, server, or a portable information handling system such as a notebook computer. Optional information handling system chassis boundary 107 is illustrated for those non-portable embodiments such as desktop computer or server.

As shown in FIG. 1, information handling system 100 of this exemplary embodiment includes at least one host processing device 105 which may be a central processing unit (CPU) such as an Intel Pentium series processor, an Advanced Micro Devices (AMD) processor or other type of host processing device that executes an operating system (OS) for system 100, e.g., Intel x86 processor, AMD x86 processor, ARM core processor, or other type of host processing device. Host processing device 105 may be provided in one embodiment with an integrated memory controller (iMC) to facilitate memory functions, although it will be understood that a memory controller may be alternatively provided as a separate chip or other circuit in other embodiments. Still referring to the exemplary embodiment of FIG. 1, main system memory 115 (e.g., DRAM) may be coupled via DDR channel 150 as shown to host processing device 105. As shown, an external display 125 (e.g., LCD or LED display, touchscreen, or other suitable display device) may be coupled to an optional graphics processing unit (GPU) 120 to provide visual images (e.g., via displayed interactive graphical user interface) to the user. GPU 120 is in turn coupled to host processing device 105 via platform controller hub (PCH) 110 which facilitates input/output functions for the information handling system 100. It will be understood that functions of GPU 105 may alternatively or additionally be integrated within the host processing device 105 and/or that other types of graphics processing devices may be present, e.g., graphics-derivative processors such as physics/gaming processors.

Still referring to FIG. 1, local system storage 135 (e.g., one or media drives such as hard disk drive/s, optical drives, NVRAM devices, Flash devices or any other suitable form of internal or external storage) may be coupled to PCH 110 and its controller chip to provide permanent storage for the information handling system 100. External input devices 145 (e.g., such as a keyboard, mouse, touchpad, touchscreen etc.) may be coupled as shown to PCH 110 and its controller chip to enable the user to interact with the information handling system 100 and programs or other software/firmware executing thereon. An expansion bus 140 may be coupled to PCH 110 to provide the information handling system 100 with plug-in functionality for additional heat-generating components 165, such as PCI cards or other types of plug-in components. Expansion bus 140 may be, for example, a PCI bus, PCI Express bus, SATA bus, USB or any other suitable expansion bus. In alternative embodiments, a system on chip ("SOC") or other type of integrated circuit may be employed that consolidates one or more of memory controller, CPU, GFX, PCI devices and other I/O into a single integrated chip. As further shown, a network interface card (NIC) 179 may be coupled to host processing device 105 to enable communication between information handling system 100 and various multiple network devices 178$_1$-178$_n$, which together may form a networking system. In one embodiment, one or more such multiple network devices 178 may be remote game servers which provide system 100 with a game portal for authentication and/or hosting of games or other applications that are indirectly launched on information handling system 100.

In the illustrated embodiment, an out-of-band processing device 180 (e.g., baseboard management controller (BMC), service processor, embedded processor, embedded controller (EC) remote access controller, etc.) may be coupled to PCH 110 and provided with persistent storage/non-volatile memory 183, although an out-of-band processing device with integrated persistent storage may also be employed. As shown in the exemplary embodiment of FIG. 1, out-of-band processing device 180 is a separate and independent processing device from any in-band host central processing unit (CPU) such as host processing device 105 that runs the host OS of an information handling system 100. In this regard, out-of-band processing device 180 may operate without management of any application executing with a host OS on the host CPU. Persistent storage 183 may contain firmware or other programming that is used by out of band processing device 180 to implement one or more user-defined system configurations such as keyboard lighting options, mouse lighting options, audio output settings, power management settings, performance monitoring recording settings, designated keyboard macros and/or variable pressure key settings and/or macros such as described in United States Patent Application Publication No. 20130067126 which is incorporated herein by reference in its entirety, etc.

Figure 2:
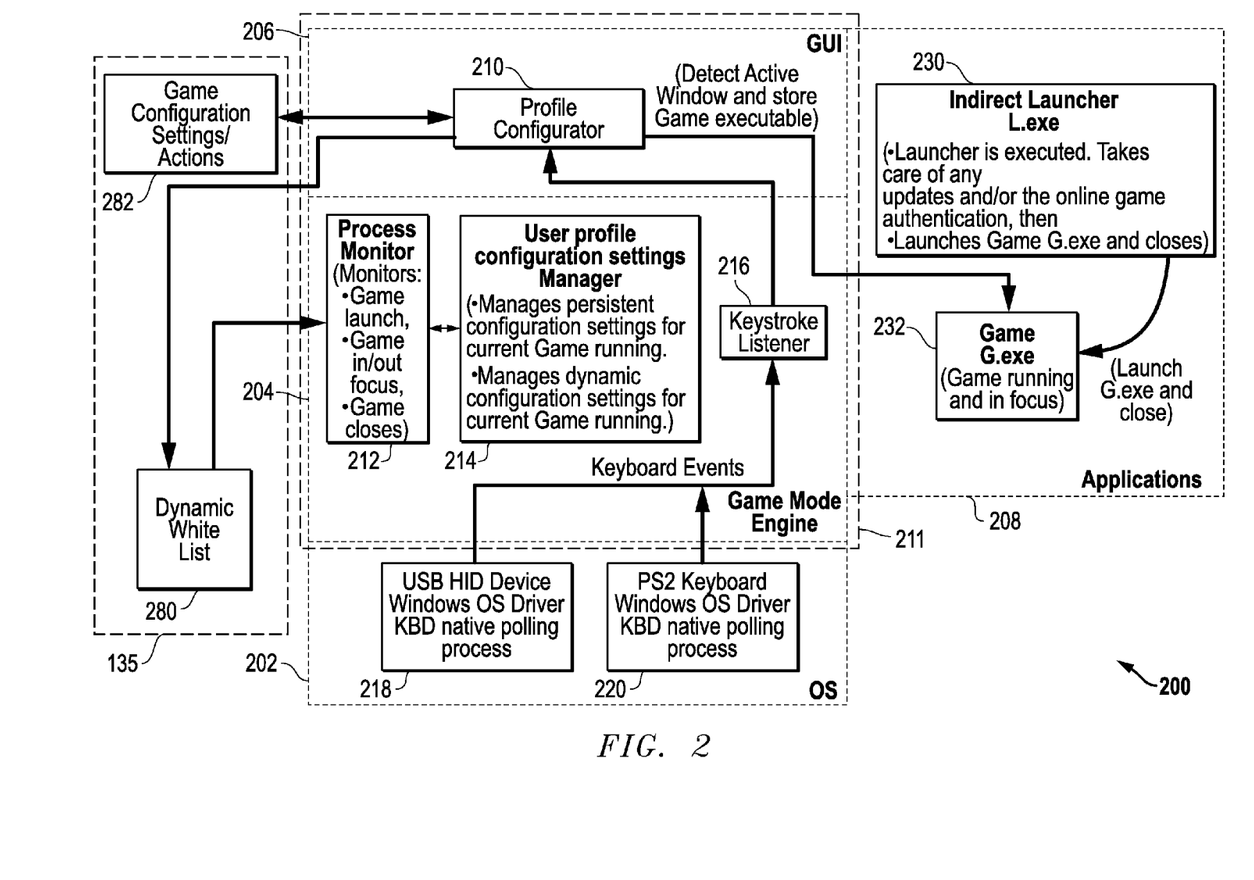
FIG. 2 illustrates a file identity capture architecture according to one exemplary embodiment of the disclosed systems and methods.

FIG. 2 illustrates one exemplary embodiment of file identity capture architecture 200. As shown, architecture 200 of this embodiment includes a persistent storage component 135, an operating system (OS) layer 202, an application control center layer 211 (e.g., a gaming control center in this embodiment) and user application layer 208. Each of components 202, 211 and 208 may be provided in one embodiment as software and/or firmware executing on host processing device 105, and/or any other suitable processing device. As shown in FIG. 2, game configuration settings/actions 282 and dynamic white list information 280 are stored on persistent storage 135 and are accessible and modifiable by components of application control center layer 211. As also shown, user application layer 208 includes indirect launcher 230 (e.g., portal launcher) and at least one game application 232 that may be locally available from storage on the information handling system or that may be a game application that is accessible across the Internet or other network. It will be understood that although described in relation to a game application embodiment, the disclosed systems and methods may be similarly implemented with any other type of indirectly launched remote or local executable file application such that terms used herein in relation to the description of a specific gaming environment embodiment (e.g., like "game mode", and gaming control center", etc.) may be interchanged with terms such as "application mode" and "application control center" when describing other types of indirectly-launched applications and/or the broad class of indirectly-launched applications.

Still referring to FIG. 2, control center layer 211 includes a profile configurator module 210 that may be configured to provide a user with the ability to associate specific system environmental configurations and actions to a given particular game, e.g., using graphical user interface (GUI) component 206 of control center layer 210 to create an application mode profile (game mode profile in this embodiment) for that given game or other type of given application. Examples of such configurations and actions include, but are not limited to, specific keyboard and mouse lighting settings, audio output settings, power management settings, performance monitoring recording settings, designated keyboard macros and/or variable pressure key settings and/or macros, etc. In one exemplary embodiment, once a user selects a game to create a new game mode, profile configurator 210 may be configured to accept and save the game settings and actions that will be associated with the particular game/application, e.g., in game configuration settings/actions 282 stored on persistent storage 135.

As shown, control center layer 211 also includes an application mode engine layer 204 (e.g., a game mode engine layer in this exemplary embodiment) that includes a process monitor (watcher) module 212, a user profile configuration settings manager 214 and keystroke listener 216. Once a new game mode profile has been successfully created, process monitor module 212 is configured to monitor for and detect the launching and closing of individual games 232 of application layer 208 by comparing the identity (name) of a particular game 232 that is currently being launched to a dynamic "white list" 280 of game executable file names that is maintained on persistent storage 280 as shown. Creation and local modification of dynamic white list 280 will be described further herein. Process monitor module 212 may be further configured to access and use information contained in the dynamic white list 280 to monitor for and detect when a particular game 232 is in or out of focus (i.e., active or not active in a window on display 125), and to provide this game focus status (active or inactive status) to the user profile configuration settings manager 214. User profile configuration settings manager 214 is in turn configured to determine whether or not settings and/or actions of a particular game mode configuration should be enabled for a given a particular game 232, e.g., settings and/or actions enabled where a match is found between a particular game 232 and an entry in the dynamic white list 280, but no settings or actions enabled where no such match is found. User profile configuration settings manager 214 may also be configured to manage when the configuration and/or action settings 282 of the particular game mode profile associated with the given game 232 are either active or inactive based on whether the particular game 232 is active or inactive, respectively (or based on whether a particular active game 232 is displayed in an active window or not).

In this regard, in a game mode dynamic setting mode, when the given game 232 is running and becomes in-focus in an active window, user profile configuration settings manager 214 terminates the default system configuration settings and/or actions (or other previous configuration settings and/or actions) and activates the configuration and/or action settings 282 of the particular game mode profile associated with the given game 232 and that will be active whenever the given game process 232 is running and in focus. In this dynamic setting mode when the given game 232 becomes not in-focus in an active window, user profile configuration settings manager 214 reverts or returns the system configuration settings and/or actions back to their previous (e.g., default) system configuration setting state and any action taken according to settings 282 is undone, even though the game 232 may remain running but not in focus in the background. In another alternative persistent setting mode embodiment, user profile configuration settings manager 214 may maintain the configuration and/or action settings 282 of the particular game mode profile associated with the given game 232 active for as long as the given game process 232 is running, regardless of whether the given game 232 is displayed in an active window, or is merely running but not in focus in the background while another application window is actively displayed. In this persistent setting mode when the given game process 232 exits and is no longer running, user profile configuration settings manager 214 reverts or returns the system configuration settings and/or actions back to their previous (e.g., default) system configuration setting state and any action taken according to settings 282 is undone.

As further illustrated in FIG. 2, a keystroke listener module 216 is provided within control center layer 211, and is configured to monitor for predefined user keystrokes entered by a user, e.g., into keyboard or other suitable user entry interface 145. Keystroke listener module 216 is configured to notify the profile configurator 210 when predefined user keystrokes occur (or are received from a user) to cause the profile configurator to trigger the capture, validation, and saving of the file name or other identifying information for a particular given game executable file 232 to dynamic white list 280 on persistent storage 135. This saved executable file identifying information may then be accessed in the future by process monitor module 212 in a manner as described above. As shown, keystroke listener module 216 is coupled to OS drivers 218 and 220 that are configured to process keystroke signals received from keyboard 145 in order to allow keystroke listener module 216 to monitor for the predefined user keystrokes entered by a user.

As further shown in FIG. 2 shows example interrelation of the components of architecture 200 that may take place when an information handling system user is creating a new game mode profile, and is indirectly launching a new game 232 with an indirect game launcher 230. As shown, the game launcher 230 responds to the user action by launching the actual game 232 that the user has designated to play. Once new game 232 is running (and in focus on the user interface 125), the user may press the predefined keystrokes which trigger the keystroke listener module 216 of game mode engine layer 204 to capture, validate, and save the name of the new game executable file in the dynamic white list 280 where it did not previously exist. The predefined keystrokes may be any suitable combination of actual keystrokes from a keyboard, or may alternatively be hand gestures, mouse events, touch screen events, or any combination thereof.

Figure 3:
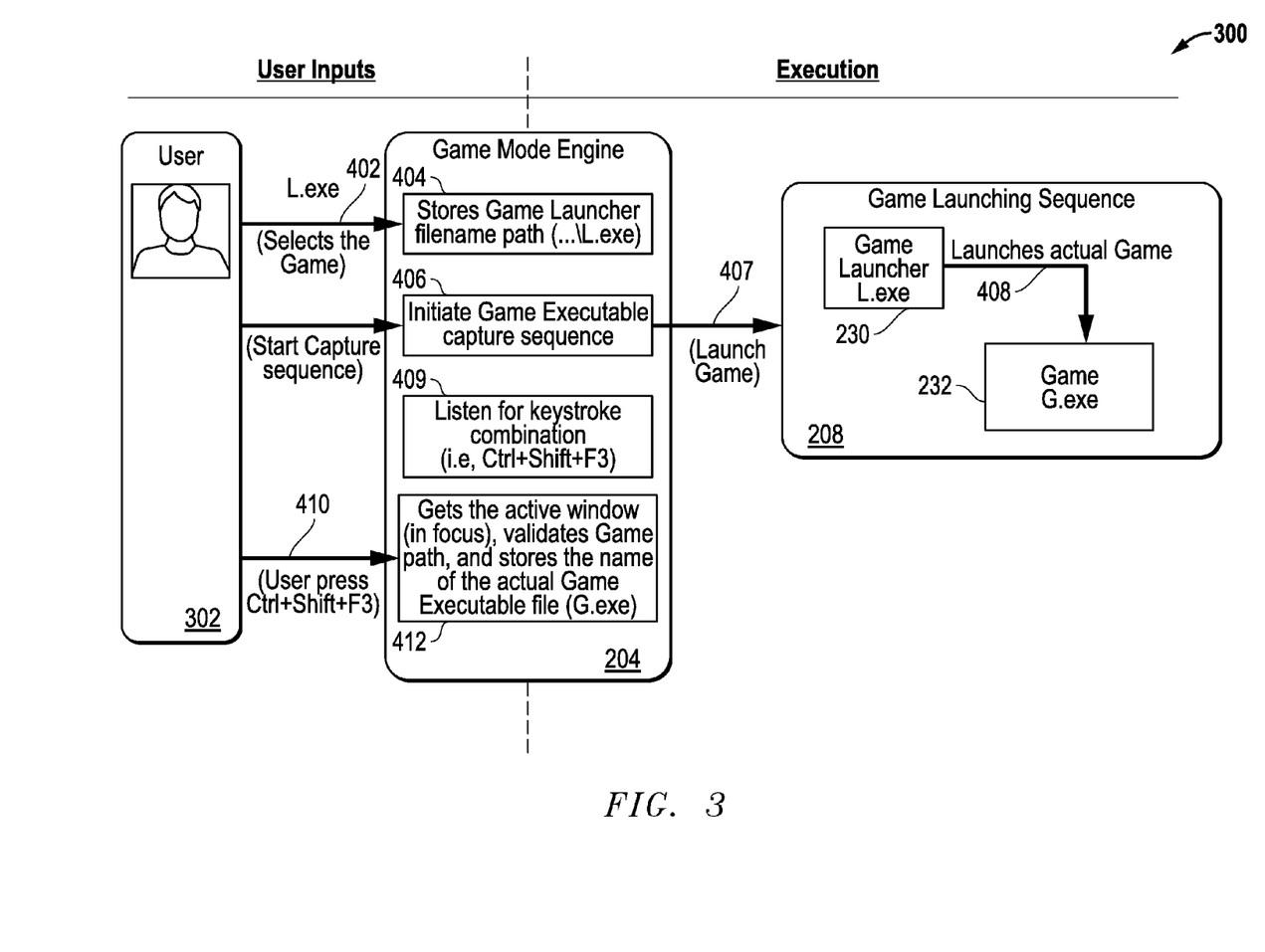
FIG. 3 illustrates an example flow chart of methodology that may be employed to capture file identity information according to one exemplary embodiment of the disclosed systems and methods.

FIG. 3 illustrates an example flow chart of methodology 300 that may be employed to capture file identity information for an indirectly-launched application according to one exemplary embodiment of the disclosed systems and methods. As shown in FIG. 3, steps of methodology 300 may be performed in this embodiment by an information handling system user 302 interacting with game mode engine layer 204 and applications layer 208 of FIG. 2. In the embodiment of FIG. 3 user 302 may be, for example, a gamer interacting with a control center layer 211 such as illustrated and described in relation to FIG. 2. In this embodiment, game mode engine layer 204 may be the specific software module of control center layer 211 that allows the user, as defined above, the ability to associate specific system configuration and actions to a particular game 232.

Figure 4:
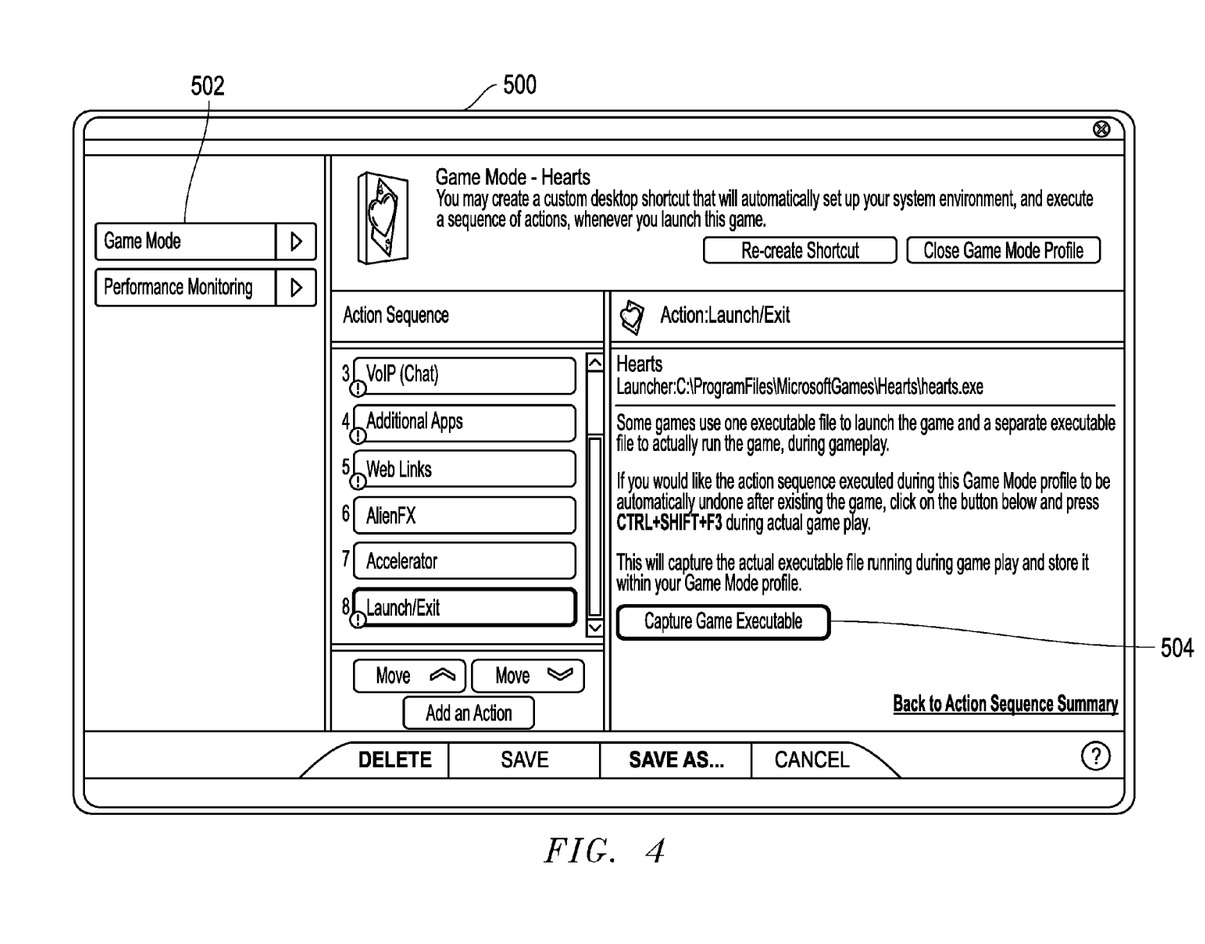
FIG. 4 illustrates a user interface according to one exemplary embodiment of the disclosed systems and methods.
Figure 5:
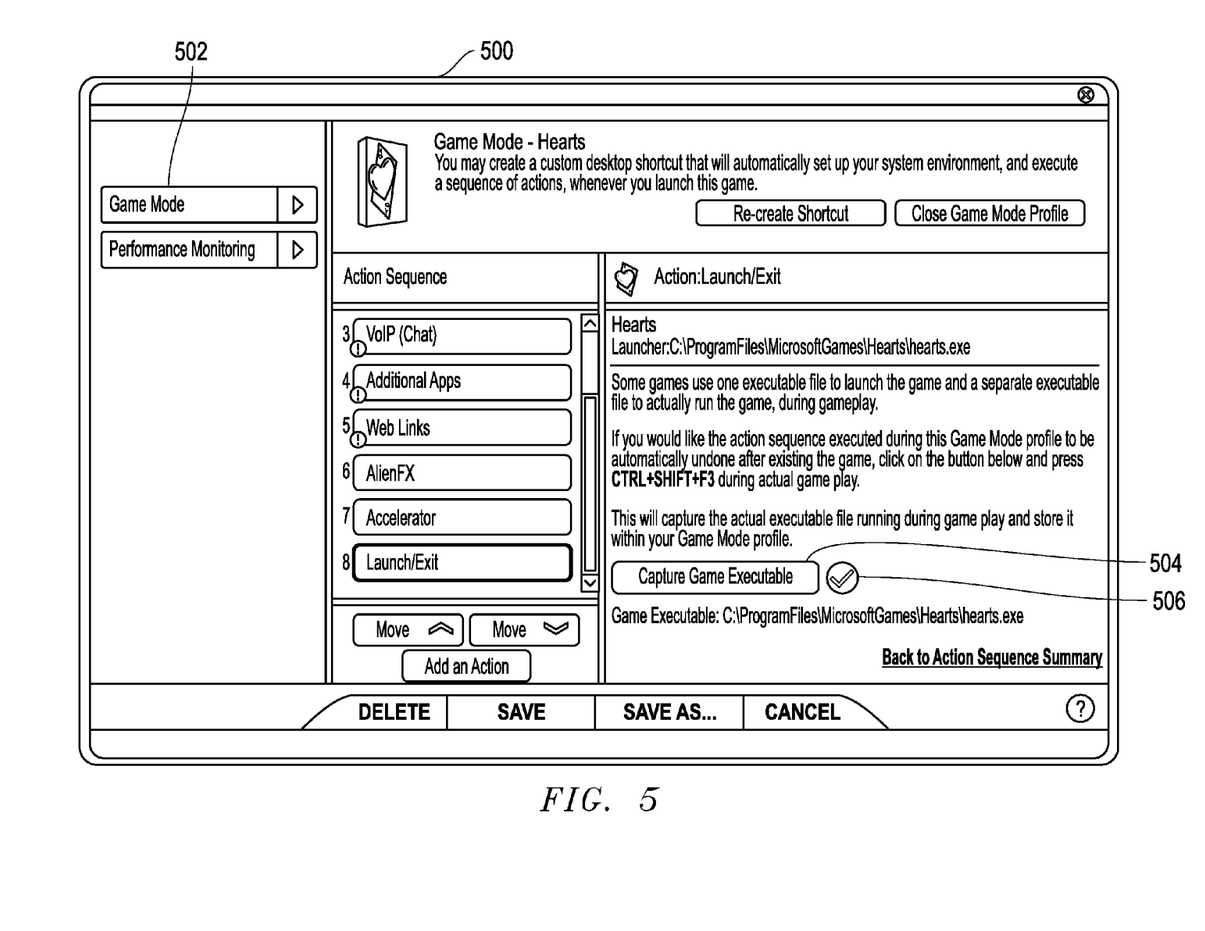
FIG. 5 illustrates a user interface according to one exemplary embodiment of the disclosed systems and methods.

Still referring to FIG. 3, methodology 300 starts in step 402 when user 302 selects a game to create a new game mode profile that includes user-configured settings and/or actions. This is illustrated by the exemplary user interface 500 of FIG. 4 where a game mode profile interface dialogue (e.g., displayed as a GUI on display 125) is opened in response to a user clicking on the "Game Mode" button 502. Next in step 404, game mode engine 204 responds to this selection by storing the actual path of the selected game launcher (e.g., game wrapper). Game mode engine 204 may then automatically initiate the game executable capture sequence in step 406 by informing the user 302 that in order to complete the configuration of a new game mode, the user 302 should launch the game by pressing an dedicated button allowing the game mode engine 204 to capture and save the actual executable game file (i.e., this is the file running when the game 232 is launched). This step is illustrated in FIG. 4 where a dedicated "Capture Game Executable" button 504 is provided for the user to allow the game mode engine 204 to capture and save the actual executable game file. As shown, interface 500 of this embodiment also provides the user with instructions and predefined keystrokes (Ctrl+Shift+F3) for allowing the user to cause game mode engine 204 to initiate capturing, validating, and locally saving the name of the game 232 together with its game executable full filename, e.g., Game Name: Hearts and Game Executable Full Filename: C:\Program Files\Microsoft Games\Hearts\hearts.exe. At the same time, game mode engine 204 launches the indirect game launcher 230 in step 407, which then proceeds to launch actual game 232 in step 408 as shown.

In one exemplary embodiment, such a dedicated button 504 may be optionally employed to initiate the game executable capture engine and launch the game launcher 230. Then, the game is launched, the user should enter the predefined keystrokes while the game is running and in focus, and the game executable capture engine detects the game/application process to store the game/application executable filename. In such an embodiment, such a dedicated button 504 may be implemented to do two things; initiate the game executable capture engine and launch the Game Launcher 230.

Next, in step 409 (after the game launcher 230 and game 232 is launched), game mode engine 204 waits (and listens or monitors) for the user 302 to enter the predefined keystrokes or other user entry information while the game is running and in focus, e.g. using QWERTY keyboard, touch screen keyboard or entry fields, mouse or touchpad pointer on GUI display, etc. In this particular example, the predefined keystrokes have been defined as Ctrl+Shift+F3 keys, although any other combination of other one or more key strokes may be employed, as may be selection from a GUI pull down list or GUI button using a mouse pointer or touchpad, etc. In one exemplary embodiment, no file identity information for the executable game file 232 will be captured and saved absent user entry of the pre-defined keystrokes. In step 410, after clicking the "Capture Game Executable" button 504 and the game 232 launches, the user 302 enters the predefined keystrokes or other user entry information. In step 412, game mode engine 204 detects this entry of the correct predefined keystrokes or other user entry information by the user 302. Game mode engine 204 then responds to detection of user entry of the correct keystroke or other user entry information in step 412 by capturing, validating, and locally saving the file identity information for the executable game file 232 in dynamic white list 280 (i.e., locally modifiable database of executable game files). A check mark 506 or other indicator may be optionally displayed as shown on interface 500 to indicate successful capture, validation and save. From this point forward whenever the user 302 launches a particular game 232, the game mode engine 204 will look up the executable game file in the dynamic white list 280 corresponding to the particular game 232 currently being launched. Once a match is found between the currently-launched game 232 and a pre-existing executable game file identity (e.g., file name) saved in dynamic white list 280, the game mode engine 204 responds by performing the designated actions and set of system configuration setting 282 that are associated with the particular launched game 232. If no match is found, then game mode engine 204 does not do anything.

It will be understood that one or more of the tasks, functions, or methodologies described herein may be implemented, for example, as software, firmware or other computer program of instructions embodied in a non-transitory tangible computer readable medium that is executed by a CPU, controller, microcontroller, processor, microprocessor, FPGA, ASIC, or other suitable processing device or combination of such processing devices.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system, comprising:
   system hardware components;
   persistent storage storing configuration settings and actions for operating the system hardware components and that is associated with at least one given indirectly launched executable file; and
   at least one processing device separate from the system hardware components and coupled to the persistent storage and the system hardware components, the processing device being configured to:
      indirectly launch and run the at least one given executable file,
      capture file identity information for the given executable file while it is launched and running, the file identity information comprising an application name or filename of the given executable file, and
      save the captured file identity information of the given indirectly launched file to a dynamic list of file identity information stored on the persistent storage while the given executable file is launched and running, the dynamic list of file identity information including a list of application names or filenames;
      implement different sets of system configuration settings and actions to operate the system hardware components, the different system configuration settings and actions including at least a first set of one or more configuration settings and actions, and a second set of one or more different configuration settings and actions associated with the given indirectly launched executable file that are saved on the persistent storage,
      monitor for and detect a current launching of the given indirectly launched executable file while operating the system hardware components with the first set of configuration settings and actions on the information handling system, and
      then respond to the currently detected indirect launching of the given executable file by:
      comparing the identity of the given currently launched executable file with the dynamic file identity list saved on the persistent storage to determine whether or not to associate the currently launched executable file with corresponding specific user-defined configuration settings and actions stored on the persistent storage for the given currently launched executable file, and
      then switching from the first set of configuration settings and actions to the second set of different configuration settings and actions associated with the given indirectly launched executable file to operate the system hardware components on the information handling system based on the comparison, and
      maintain the specific user-defined configuration settings and actions the entire time that the given currently launched executable file is active;
   where the first and second different sets of system configuration settings and actions comprise at least one of specific keyboard lighting settings, mouse lighting settings, audio output settings, or power management settings to operate the system hardware components.

2. The system of claim 1, where the at least one processing device is further configured to indirectly launch the at least one given executable file using an indirect launcher that is a separate executable file from the given executable file.

3. The system of claim 1, where the at least one processing device is further configured to:
   receive the specific configuration settings and actions from an information handling system user for the given indirectly launched executable file while the executable file is running, associate the received specific user-defined configuration settings and actions with the given indirectly launched executable file while the executable file is running; and save the specific user-defined configuration settings and actions associated with the given indirectly launched executable file to the persistent storage for future access or retrieval after the given indirectly launched executable file is closed.

4. The system of claim 1, where the at least one processing device is further configured to:

monitor for and detect the closing of the given indirectly launched executable file while implementing the second set of configuration settings to operate the system hardware and actions on the information handling system; and then respond to the currently detected indirect launching of the given executable file by switching from the second set of configuration settings and actions to the first set of configuration settings and actions to operate the system hardware on the information handling system.

5. The system of claim 1, where the at least one processing device is further configured to:

monitor for and detect when the given indirectly launched executable file is in active focus within a window of a user interface presented by the processing device to the user; and switch from implementation of the first set of configuration settings to the second set of different configuration settings and actions to operate the system hardware on the information handling system only when the given indirectly launched executable file is in active focus within a window of a user interface; and switch back from the second set of configuration settings and actions to the first set of configuration settings and actions to operate the system hardware whenever the given indirectly launched executable file is not in active focus within the window of a user interface.

6. The system of claim 3, where the processing device is further configured to respond to user selection of the given executable file by:

indirectly launching the given user-selected executable file;

automatically requesting the user to enter a command to initiate capture of file identity information for the given executable file while the given user-selected executable file is launched and running; and responding to user entry of the requested command by capturing and saving the file identity information of the given executable game file to the dynamic list.

7. A method of managing file identity information for an information handling system comprising system hardware components, the method comprising using at least one processing device to:

indirectly launch and run at least one given executable file;

capture file identity information for the given executable file while it is launched and running, the file identity information comprising an application name or filename of the given executable file;

save the captured file identity information of the given indirectly launched file to a dynamic list of file identity information stored on the persistent storage while the given executable file is launched and running, the dynamic list of file identity information including a list of application names or filenames;

implement different sets of system configuration settings and actions to operate the system hardware components, the different system configuration settings and actions including at least a first set of one or more configuration settings and actions, and a second set of one or more different configuration settings and actions associated with the given indirectly launched executable file that are saved on the persistent storage, monitor for and detect a current launching of the given indirectly launched executable file while operating the system hardware components with the first set of configuration settings and actions on the information handling system, and then respond to the currently detected indirect launching of the given executable file by:

comparing the identity of the given currently launched executable file with the dynamic file identity list saved on the persistent storage to determine whether or not to associate the currently launched executable file with corresponding specific user-defined configuration settings and actions stored on the persistent storage for the given currently launched executable file, then switching from the first set of configuration settings and actions to the second set of different configuration settings and actions associated with the given indirectly launched executable file to operate the system hardware components on the information handling system based on the comparison, and maintaining the specific user-defined configuration settings and actions the entire time that the given currently launched executable file is active;

where the first and second different sets of system configuration settings and actions comprise at least one of specific keyboard lighting settings, mouse lighting settings, audio output settings, or power management settings for operating the system hardware components.

8. The method of claim 7, further comprising using the at least one processing device to indirectly launch the at least one given executable file with an indirect launcher that is a separate executable file from the given executable file.

9. The method of claim 7, further comprising using the at least one processing device to:

receive the specific configuration settings and actions from an information handling system user for the given indirectly launched executable file while the executable file is running;

associate the received specific user-defined configuration settings and actions with the given indirectly launched executable file while the executable file is running; and save the specific user-defined configuration settings and actions associated with the given indirectly launched executable file to the persistent storage for future access or retrieval after the given indirectly launched executable file is closed.

10. The method of claim 7, further comprising using the at least one processing device to:

monitor for and detect the closing of the given indirectly launched executable file while implementing the second set of configuration settings and actions to operate the system hardware on the information handling system; and then respond to the currently detected indirect launching of the given executable file by switching from the second set of configuration settings and actions to the first set of configuration settings and actions to operate the system hardware.

11. The method of claim 7, further comprising using the at least one processing device to:

monitor for and detect when the given indirectly launched executable file is in active focus within a window of a user interface presented by the processing device to the user; and switch from implementation of the first set of configuration settings and actions to the second set of different configuration settings and actions and actions to operate the system hardware on the information handling system only when the given indirectly launched executable file is in active focus within a window of a user interface; and switch back from the second set of configuration settings and actions to the first set of configuration settings and actions and actions to operate the system hardware actions whenever the given indirectly launched executable file is not in active focus within the window of a user interface.

12. The method of claim 9, further comprising using the at least one processing device to respond to user selection of the given executable file by:

indirectly launching the given user-selected executable file;

automatically requesting the user to enter a command to initiate capture of file identity information for the given executable file while the given user-selected executable file is launched and running; and responding to user entry of the requested command by capturing and saving the file identity information of the given executable game file to the dynamic list.

13. The system of claim 1, where the system hardware components comprise a keyboard; where the different system configuration settings and actions include a first keyboard lighting setting and action and a different second keyboard lighting setting and action associated with the given indirectly launched executable file; and where the at least one processing device is configured to monitor for and detect a current launching of the given indirectly launched executable file while operating the keyboard with the first keyboard lighting setting and action, and then to switch to operate the keyboard with the different second keyboard lighting setting and action associated with the given indirectly launched executable file based on the comparison.

14. The system of claim 1, where the system hardware components comprise a mouse; where the different system configuration settings include a first mouse lighting setting and action and a different second mouse lighting setting and action associated with the given indirectly launched executable file; and where the at least one processing device is configured to monitor for and detect a current launching of the given indirectly launched executable file while operating the mouse with the first mouse lighting setting and action and then to switch to operate the mouse with the different second mouse lighting setting and action associated with the given indirectly launched executable file based on the comparison.

15. The system of claim 1, where the file identity information comprises a filename of the given executable file; and where the dynamic list of file identity information includes a list of filenames.

16. The method of claim 7, where the system hardware components comprise a keyboard; where the different system configuration settings include a first keyboard lighting setting and a different second keyboard lighting setting associated with the given indirectly launched executable file; and where the method further comprises using the at least one processing device to monitor for and detect a current launching of the given indirectly launched executable file while operating the keyboard with the first keyboard lighting setting and action, and then to switch to operate the keyboard with the different second keyboard lighting setting and action associated with the given indirectly launched executable file based on the comparison.

17. The method of claim 7, where the system hardware components comprise a mouse; where the different system configuration settings include a first mouse lighting setting and a different second mouse lighting setting associated with the given indirectly launched executable file; and where the method further comprises using the at least one processing device to monitor for and detect a current launching of the given indirectly launched executable file while operating the mouse with the first mouse lighting setting and action, and then to switch to operate the mouse with the different second mouse lighting setting and action associated with the given indirectly launched executable file based on the comparison.

18. The method of claim 7, where the file identity information comprises a filename of the given executable file; and where the dynamic list of file identity information includes a list of filenames.

* * * * *